No. 716,990. Patented Dec. 30, 1902.
J. E. T. DICKINSON.
HEATING STOVE.
(Application filed May 26, 1902.)
(No Model.) 2 Sheets—Sheet 1.
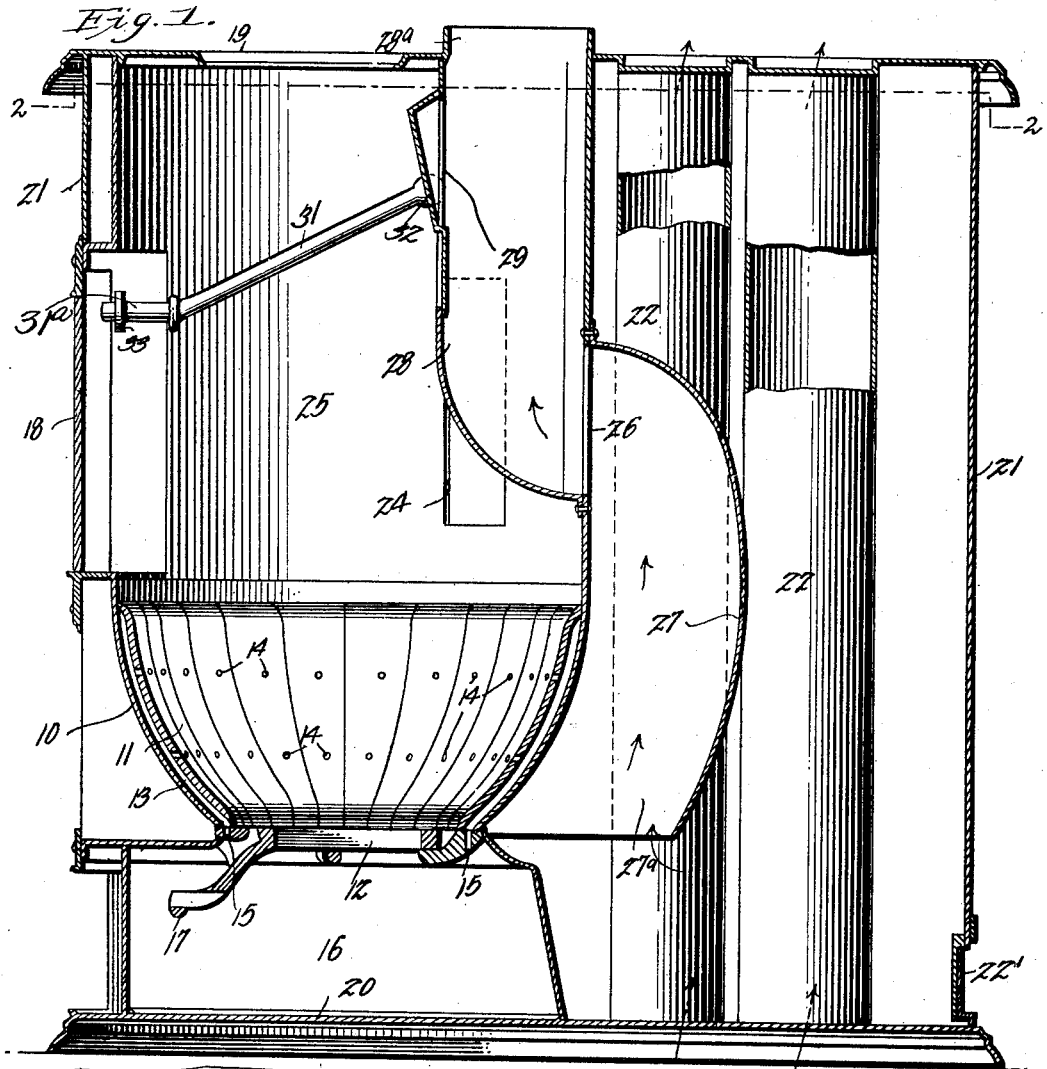
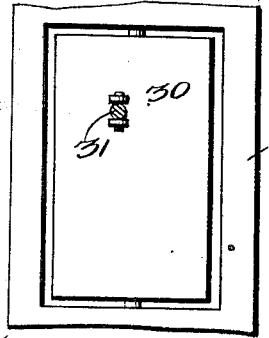
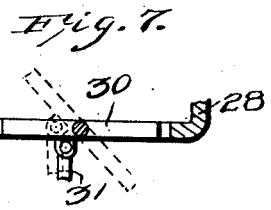
Witnesses
J. E. T. Dickinson, Inventor.
by C. A. Snow & Co.
Attorneys No. 716,990. Patented Dec. 30, 1902.
J. E. T. DICKINSON.
HEATING STOVE.
(Application filed May 26, 1902.)
(No Model.) 2 Sheets—Sheet 2.
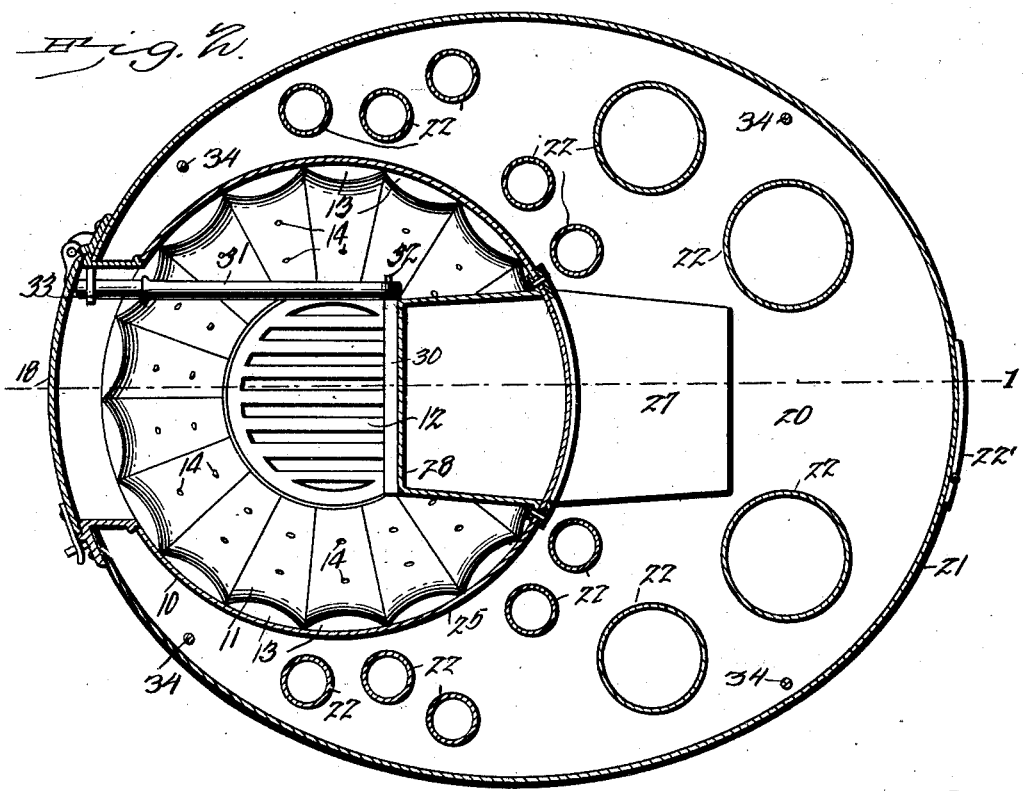
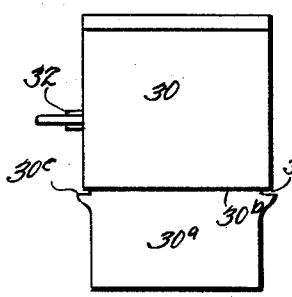
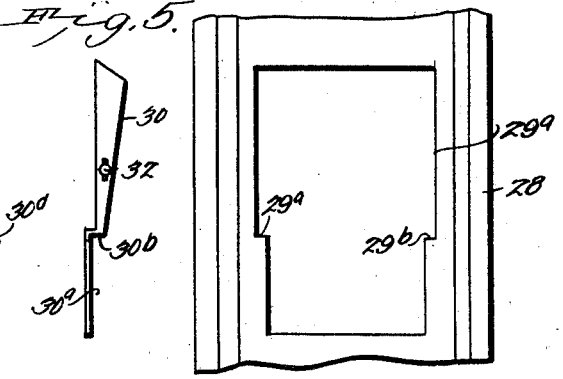
Witnesses
E. F. Stewart
C. N. Woodward
J. E. T. Dickinson, Inventor.
by
Attorneys

UNITED STATES PATENT OFFICE.

JOHN E. T. DICKINSON, OF BEATRICE, NEBRASKA, ASSIGNOR OF ONE-HALF TO SAMUEL AVEY, OF BEATRICE, NEBRASKA.

HEATING-STOVE.

SPECIFICATION forming part of Letters Patent No. 716,990, dated December 30, 1902.

Application filed May 26, 1902. Serial No. 109,010. (No model.)

*To all whom it may concern:*

Be it known that I, JOHN E. T. DICKINSON, a citizen of the United States, residing at Beatrice, in the county of Gage and State of Nebraska, have invented a new and useful Heating-Stove, of which the following is a specification.

This invention relates to heating apparatus in which is combined the qualities of both the heating-stove and the heating-furnace; and the invention consists in certain novel features of the construction, as hereinafter shown and described, and specifically pointed out in the claims.

In the drawings illustrative of the invention, Figure 1 is a vertical sectional elevation on the line I I of Fig. 2. Fig. 2 is a transverse section on the line II II of Fig. 1. Fig. 3 is a detail view of the doorway for the direct draft into the smoke-flue. Fig. 4 is a front view, and Fig. 5 is an edge view, of the direct-draft valve detached. Fig. 6 is a front view, and Fig. 7 is a sectional view, illustrating a modification in the structure of the direct-draft valve.

In this invention is comprised a stove containing a fire-chamber, a drum above the fire-chamber, into which the products of the combustion arise, an inclosing shell extending downward, into which the products of the combustion are caused to pass before rising upward into the smoke-exit flue, and a series of cold-air flues within the shell and between the shell and the stove, upward through which the colder air is caused to pass by the influence of the heat upon the products of the combustion.

The stove combustion-chamber is represented at 10, preferably outwardly flaring, as shown, and lined with fire-brick (indicated at 11) and with a grate in its lower part, as shown at 12.

The fire-brick lining will preferably be arranged with outwardly-curving interior sides and spaced apart from the chamber 10, leaving an annular air-space 13 between the fire-brick and the chamber, as shown in Fig. 1. The fire-brick will preferably be provided with numerous apertures 14, leading from the air-chamber 13 into the fire-box, and with air-inlets 15, leading from the ash-pit 16 upward through the air-space 13 into the fire-box, so that a constant current of cold air will be supplied between the casing 10 of the combustion-chamber and the fire-brick 11 and prevent the casing from burning out. This current of inflowing cold air becomes heated in its passage through the space 13 by contact with the hot fire-box lining and passes out into the fire-box through the apertures 14, where it mixes with the gases of combustion and produces a very intense heat with a minimum consumption of fuel. The fire-brick will preferably be made in sections and supported by the usual ribs upon a flange extending inward at the bottom of the fire-chamber, as shown, the space 13 being closed at a point even with the top of the fire-box, as shown in Fig. 1.

The grate will be of the ordinary construction and adapted to be rotated, as by a depending arm 17, with which the usual shaker is engaged through the ash-pit door or a slot through the front of the stove for that purpose.

The feed-door to the combustion-chamber is indicated at 18 and will be of the ordinary construction.

The top of the stove is indicated at 19 and the bottom at 20, these portions being extended in all directions from the stove and connected at their outer edges by a vertical shell 21.

The portions 19 and 20 will be preferably elliptical in outline and will be extended farther from the rear of the stove portion than from its front, so that a contracted area will be formed between the front of the stove and the outer shell, and a much larger area between the rear of the stove and the rear of the shell, as more clearly indicated in Fig. 2.

Connecting the top 19 and the bottom 20 of the apparatus within the shell 21 and between it and the stove are numerous flues 22, open at their ends, so that air-currents will freely pass through the shell within the flues. These flues may be of any suitable size and varied in size, as indicated in Fig. 2, and will be formed to correspond to the requirements of the apparatus, some forms of the apparatus requiring more numerous and larger flues than others, and limitations are not desired, therefore, upon any of the sizes of the flues or other parts, as the apparatus is capable of being applied to any size of heating apparatus.

One or more "clean-out" doors 22' may be arranged at suitable points in the shell 21, by which means the ashes and other similar products of the combustion which settle in the shell may be removed.

At suitable intervals apertures 24 will be formed through the shell or drum 25 of the stove, as indicated, through which the products of the combustion will pass into the interior of the shell 21.

Formed through the rear of the drum 25 is an aperture 26, and covering this aperture and connected to the drum 25 and depending downwardly therefrom is a hood 27, opening downwardly at 27$^a$ into the interior of the shell 21, as shown.

Connected to the interior of the drum 25 and inclosing the inner side of the aperture 26 is an exit-flue 28, rising upward through the top 19 of the apparatus and opening outward, as indicated at 28$^a$.

The smoke-flue leading to the chimney will be connected to the collar at the point 28$^a$ in the usual manner, this flue not being shown, as it forms no part of the present invention. By this arrangement the products of the combustion will pass through the apertures 24, be conducted around the flues 22 and downward in the shell 21 and upward through the hood 27, through the aperture 26, and thence out through the outlet-flue 28. By this means the products of the combustion are caused to travel around within the shell 21 and around the flues 22 and come in contact with every part of it and with every part of the numerous flues 22, and thereby retarded and compelled to take circuitous routes throughout the whole interior of the shell 21 and be deflected to the bottom part of the shell before it can enter the hood 27 at its inlet 27$^a$, so that the heat from the products of the combustion is thoroughly utilized and caused to radiate through the flues 22 and outward through the shell 21 and influence not only the air passing through the flues, but also the air surrounding the shell 21.

The bottom 20 of the apparatus will be located free from the floor, so that the air can circulate freely beneath it and enter the lower ends of the flues 22, so that the colder air near the floors will be caused to pass into the flues and, coming in contact with the heat radiated from the products of the combustion within the shell 21, will be induced to move rapidly upward through the flues, and thereby produce a very rapid upward movement and the consequent circulation of the air throughout the room.

All the good qualities of an ordinary heating-stove and a circulating furnace apparatus are combined in one and great economy of fuel insured, as all the heat units in the products of the combustion are thoroughly utilized and radiated into the atmosphere within the flues 22 and surrounding the shell 21 before the incombustible gases and other volatile refuse matter escapes finally at the outlet 28$^a$. A comparatively small amount of fuel may be employed in the combustion-chamber and produce the same results as a much larger quantity of fuel employed in an ordinary stove or furnace, as the valuable results of the combustion are so thoroughly utilized.

A direct-draft aperture 29 will be formed through the flue 28, leading from the interior of the drum, as indicated, the lower part of the aperture being narrower than the upper part, whereby shoulders 29$^a$ 29$^b$ are formed, as shown in Fig. 3.

The closure to the aperture 29 is shown in Figs. 4 and 5, consisting of the outwardly-inclined upper portion 30 and the inwardly-projecting lower portion 30$^a$, a shoulder 30$^b$ connecting the two portions, and with recesses 30$^c$ and 30$^d$, adapted to engage, respectively, the shoulders 29$^a$ and 29$^b$. The portion 30$^a$ will be inserted into the interior of the flue 28, with the recesses 30$^c$ 30$^d$ engaging the shoulders 29$^a$ 29$^b$ and movable thereon as intermediately-disposed hinges. When thus arranged, the portion 30 engages the flue 28, surrounding the upper portion of the aperture 29 on the outside of the flue, and the portion 30$^a$ engaging the lower portion of the aperture 29 within the flue and in engagement with the interior of the flue surrounding the lower portion of the aperture 29, as indicated in Fig. 1. The upper portion of the valve 30 extends for a considerable distance into the drum 25 and overhangs the lower portion 30$^a$ of the valve, so that if left to itself the upper portion 30 would tilt downward and outward and carry the lower portion inward and upward, and thus open the valve by swinging upon its hinge formed by the coaction of the recesses 30$^c$ 30$^d$ and the shoulders 29$^a$ 29$^b$, and to support the valve closed means are provided whereby the closing of the feed-door to the combustion-chamber likewise closes the valve and permits the valve to automatically open when the feed-door is open.

The indirect draft through the apertures 24 and thence through the shell 21 to the flues 27 28 retards the products of the combustion to such an extent that the opening of the feed-door would cause the smoke to escape therethrough if some means were not provided to permit this smoke to escape directly into the exit-flue 28, and this valve 30 30$^a$ provides this escape and will be opened automatically, as before described, by the opening of the feed-door.

The means for operating the valve 30 30$^a$ consists in a bar 31, pivoted by its upper end at 32 to the upper portion 30 of the valve and supports it loosely by its lower outer end in a keeper 33, attached to the inner side of the casing of the feed-door adjacent to the hinged side of the latter.

The outer end of the bar 31 engages the inner surface of the feed-door 18, as shown in Fig. 2, and the bar will be so disposed that when the door 18 is closed the bar will be pressed with sufficient force to maintain the valve 30 30$^a$ closed, as indicated in Figs. 1 and 2. For a short distance the bar 31 is horizontal, as indicated at 31$^a$, and provided at the inner end of the horizontal portion with stops 31$^b$, this horizontal portion providing for the outward movement of the bar 31 by the gravity of the upper portion 30 of the valve, so that when the door is open the bar will follow up the door until the stops 31$^b$ engage the keeper 33, which action will carry the upper portion of the valve outward and the lower portion inward, and thus open the aperture 29 and provide a free direct draft from the fire-chamber into the outlet-flue.

Any suitable latches or other fastening means may be provided for the door 18 and also for the ash-pit door.

The top 19 and the bottom 20 will be provided with the usual flanges or ribs to engage the ends of the shell 21, the flues 22, the drum 25, and the ash-pit 16 and the whole connected by tie-rods in the usual manner, the latter indicated at 34. The proportions of the parts may be modified to suit different kinds of fuel and the different conditions under which the apparatus is employed, and the apparatus may be further modified in minor particulars without departing from the spirit of the invention or sacrificing any of its advantages.

The arrangement of the flue 28, projecting inward above the fire-pot, as shown in Fig. 1, is an important feature of the invention, as the heat rising from the fire comes in contact with the flue in passing to the outlets 24 and heats the gas passing therethrough very quickly and to a high degree, thereby greatly facilitating and accelerating the passage of the air and products of combustion through it. This greatly increases the "draft," as the higher the air in the escape-flue is heated the more rapidly will it rise and pass through the flues, thereby causing a correspondingly rapid inflow through the ash-pit and upward through the grate.

The direct-draft valve 30 30$^a$ might be operated upon vertical pintles, as indicated in Figs. 6 and 7, under some circumstances; but this modification would not be a departure from the principle of the invention or sacrifice any of its advantages.

Having thus described my invention, what I claim is—

1. In a heating apparatus, an inclosing shell, a combustion-chamber within said shell, a flue with its inlet in the interior of said shell near its lower part and passing outward through said chamber above the fire therein, outlet-apertures between said combustion-chamber and shell, substantially as described.

2. In a heating apparatus, an inclosing shell, a combustion-chamber within said shell, an aperture in said chamber above the fire therein, a flue engaging said aperture and extending through said combustion-chamber, a hood engaging said aperture exteriorly of said combustion-chamber, and extending to a point near the lower part of the interior of said shell, and outlet-apertures between said combustion-chamber and said shell, substantially as described.

3. In a heating apparatus, an inclosing shell, a combustion-chamber within said shell, a flue with its inlet in the interior of said shell near its lower part and passing outward through said chamber above the fire therein, outlet-apertures between said combustion-chamber and shell, an aperture in said flue within said combustion-chamber, and a valve forming a closure to said flue-aperture, and means for operating said valve, whereby a direct draft is provided from said combustion-chamber, substantially as described.

4. In a heating apparatus, an inclosing shell, a combustion-chamber within said shell, a drum extending upward from said combustion-chamber, a feed-door leading into said drum through said shell, an aperture in said drum, a flue inclosing said aperture and extending upward through the interior of said drum, a hood engaging said aperture exteriorly of said drum and extending to a point adjacent to the lower part of said shell, whereby an outlet is formed from the lower part of said shell through said drum, apertures connecting said drum and shell, an aperture in said flue within said drum, a valve closing said aperture, and means between said drum and feed-door whereby the opening and closing of said door will open and close said valve, substantially as described.

5. In a heating apparatus, an inclosing shell, a combustion-chamber within said shell, a drum extending upward from said combustion-chamber, a feed-door leading into said drum through said shell, an aperture in said drum, a flue inclosing said aperture and extending upward through the interior of said drum, outlet-apertures connecting said drum and shell, a hood engaging said flue exteriorly of said drum and depending to a point near the lower part of said shell, an aperture in said flue within said drum, a valve closing said aperture, and means between said valve and feed-door whereby the opening of said door will open said valve, substantially as described.

6. In a heating apparatus, an inclosing shell, a combustion-chamber within said shell, a drum extending upward from said combustion-chamber, an aperture in said drum, a flue inclosing said aperture and extending upward through the interior of said drum, outlet-apertures connecting said drum and shell, a hood engaging said flue exteriorly of said drum and depending to a point adjacent to the lower part of said shell, substantially as described.

7. In a heating apparatus, an inclosing shell, a combustion-chamber within said shell, an aperture within said chamber above the fire therein, a flue engaging said aperture and extending through said combustion-chamber, a hood engaging said aperture and flue exteriorly of said chamber, and extending to a point near the lower part of the interior of said shell, outlet-apertures between said combustion-chamber and said shell, and cold-air flues leading through said shell, substantially as described.

8. In a heating apparatus, an inclosing shell, a combustion-chamber within said shell, smoke-apertures in the casing of said combustion-chamber above the fire-box, and means for conveying the products of combustion from a point near the bottom of the outer shell, through the combustion-chamber and to the point of final exit.

In testimony that I claim the foregoing as my own I have hereto affixed my signature in the presence of two witnesses.

JOHN E. T. DICKINSON.

Witnesses:
WALTER D. HILL,
A. W. MAYER.